United States Patent [19] [11] 4,274,038
Sawyer [45] Jun. 16, 1981

[54] ELECTRICAL SERVO ACTUATOR BRACKET

[75] Inventor: Ralph V. Sawyer, Lancaster, Calif.

[73] Assignee: The United States of America as represented by the Administrator of the National Aeronautics and Space Administration, Washington, D.C.

[21] Appl. No.: 135,056

[22] Filed: Mar. 28, 1980

[51] Int. Cl.$^3$ ................ G05B 1/06

[52] U.S. Cl. ................ 318/663; 74/89; 92/130 R

[58] Field of Search ................ 318/566, 663; 74/89; 92/130 R; 251/63.6

[56] References Cited

U.S. PATENT DOCUMENTS

| | | | |
|---|---|---|---|
| 2,968,465 | 1/1961 | Flick et al. | 251/63.6 |
| 3,704,405 | 11/1972 | Miller et al. | 318/663 X |
| 3,727,523 | 4/1973 | Gulick | 74/89.15 |
| 4,170,169 | 10/1979 | Shafer | 92/130 R |
| 4,191,913 | 3/1980 | Arnold et al. | 318/663 X |

*Primary Examiner*—B. Dobeck
*Attorney, Agent, or Firm*—Monte F. Mott; John R. Manning; Paul F. McCaul

[57] ABSTRACT

A bracket for an electrical servo actuator wherein said servo actuator (10) is mounted on a support arm (12) which is allowed to pivot on a bolt (14) through a fixed mounting bracket (16). The actuator is pivotally connected to the end of the support arm by a bolt (18) which has an extension (24) allowed to pass through a slot (26) in the fixed mounting bracket. An actuator rod (34) extends from the servo actuator to a crank arm (32) which turns a control shaft (36). A short linear thrust of the rod pivots the crank arm through about 90° for full-on control with the rod contracted into the servo actuator, and full-off control when the rod is extended from the actuator. A spring (28) is connected at one end to the fixed mounting bracket and at the other end to the extension (24) of the bolt (18) connecting the actuator to the support arm. The spring pulls the support arm toward the crank arm, thus moving the servo actuator and actuator rod toward the control crank arm once the actuator rod is fully extended in the full-off position. This assures the turning of the control shaft to a full-off position. A stop bolt (40) and slot (42) are provided to limit pivot motion. Once fully extended, the spring pivots the motion.

3 Claims, 4 Drawing Figures

ELECTRICAL SERVO ACTUATOR BRACKET

ORIGIN OF INVENTION

The invention described herein was made by an employee of the United States Government and may be manufactured and used by and for the Government for Government purposes without the payment of any royalties thereon or therefor.

BACKGROUND OF THE INVENTION

This invention relates to an electrical servo actuator, and more particularly to an actuator for fuel control valves on combustion engines such as jet engines.

In jet engines, a servo actuator extends a control rod to rotate a crank arm in a direction to shut off a throttle valve at zero-volt input, but the servo cannot control an actuator to absolute zero input. The term, "servo actuator" is here used in the broad sense of an electromechanical device which delivers power to move a control rod. The servo actuator includes an amplifier and position feedback potentiometers. The position feedback signal is compared to a command position signal at the input of the amplifier. Since the amplifier of the servo actuator operates on a difference signal at the input thereof, the position output can only be driven to approach the command position input; it cannot control position to an absolute zero difference. The problem then is to drive the control rod enough for the throttle valve operated by the crank arm to "bottom" (cut off all fuel flow) when a zero-volt command is acted on, i.e., when the command signal input drops to zero.

An attempt to control a servo actuator to a zero-volt position from position feedback potentiometers could be made with some offset signal for the zero input condition, but that may result in repeated servo burn-outs, particularly where the feedback potentiometer exceeds its limits. What is required is to provide a servo actuator with the ability to so drive an actuator rod as to "bottom" an object being controlled by the rod, i.e., to place the object being controlled in an absolute zero position without the risk of position feedback potentiometers exceeding their limits and burning out a servo amplifier.

SUMMARY OF THE INVENTION

In accordance with the present invention, a servo actuator is mounted on a support arm which is allowed to pivot on a bolt through a fixed mounting bracket. The actuator is pivotally connected to the end of the support arm by a bolt which has an extension allowed to pass through a slot in the fixed mounting bracket. An actuator rod extends from the servo actuator to a crank arm which turns a control shaft. A short linear thrust of the rod pivots the crank arm through about 90° for full-on control with the rod contracted into the servo actuator, and full-off control when the rod is extended from the actuator. To be sure the control bottoms in the full off position by turning the control shaft sufficiently in one direction without risk of damage to the servo actuator, a spring connected at one end to the fixed mounting bracket and at the other end to the extension of the bolt connecting the actuator to the support arm. The spring pulls the support arm toward the crank arm, thus moving the servo actuator and actuator rod toward the control crank arm once the actuator rod is fully extended in the full-off position. This assures the turning of the control shaft to a full-off position. When the actuator extends the control arm, the support arm may pivot away from the crank arm, but a stop is provided to limit pivot motion in that direction. Once fully extended, the spring pivots the support arm toward the crank arm. Means in the mounting arm is adjusted to limit the travel of the support arm toward the crank arm under the force of the spring. In that manner, the support arm is allowed to pivot over a small angle away from the crank arm while the actuator arm is being extended to a full-off position, and toward the crank arm once the control arm is fully extended to assure the crank arm is rotated to a full-off position. The extent to which the control arm is allowed to pivot toward the crank arm is adjusted to be sufficient to cause the crank arm to be rotated to the full off position.

The novel features that are considered characteristic of this invention are set forth with particularity in the appended claims. The invention will best be understood from the following description when read in connection with the accompanying drawings.

Figures 1, 2, 3, 4:
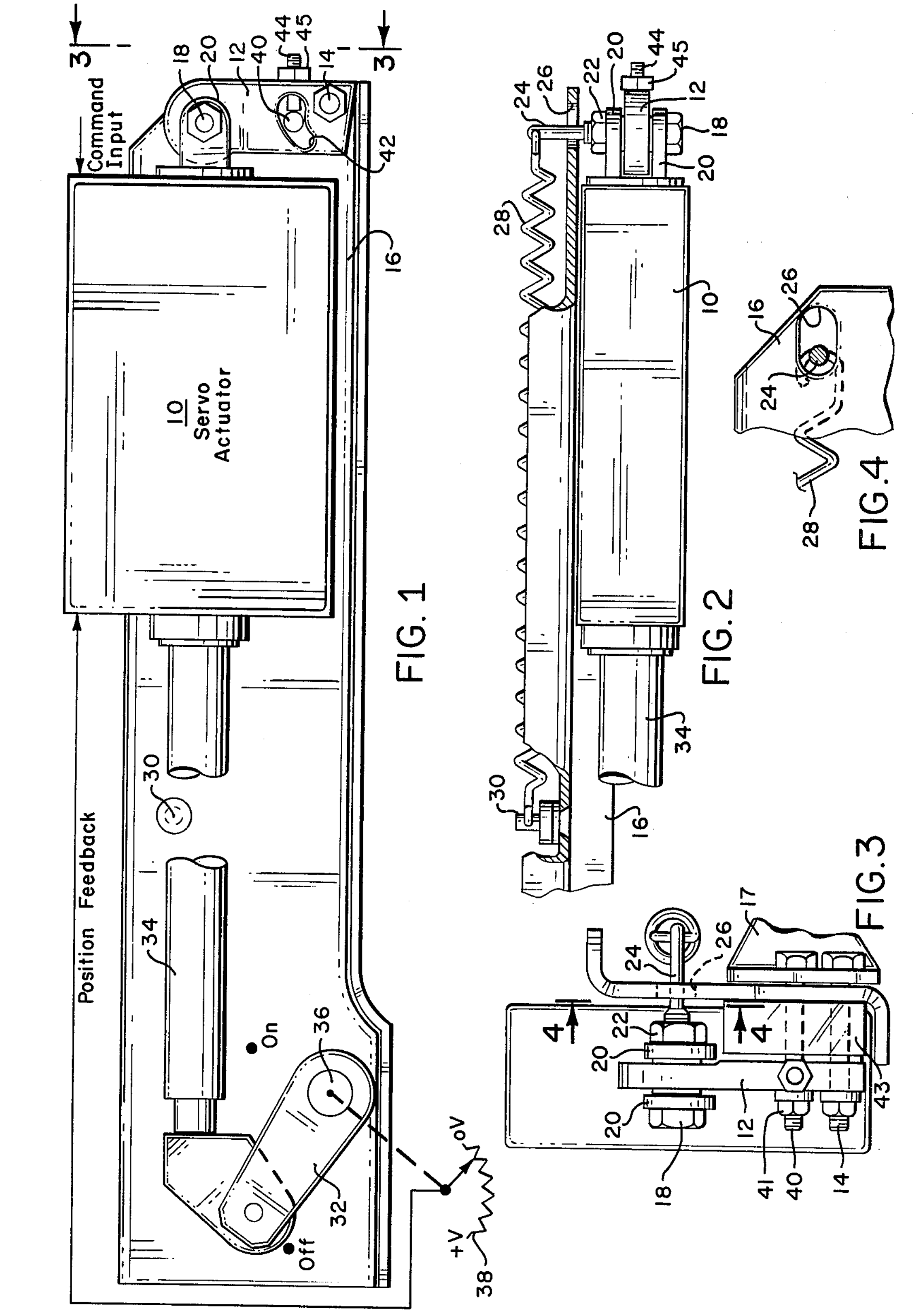
FIG. 1 is a side view of an electrical servo actuator and bracket embodying the present invention.
FIG. 2 is a fragmentary top view of the servo actuator and bracket of FIG. 1.
FIG. 3 is an end view taken along a line 3-3 in FIG. 1.
FIG. 4 is a view taken along a line 4-4 in FIG. 3.

Reference will now be made in detail to an exemplary embodiment of the invention, an example of which is illustrated in the accompanying drawings.

DESCRIPTION OF PREFERRED EMBODIMENTS

Referring now to FIG. 1, a servo actuator 10 is mounted on a support arm 12 which is pivoted on a bolt 14 passing through a mounting bracket 16. The mounting bracket is, in turn, secured to a fixed point bracket 17. The actuator 10 is pivotally connected to the end of the support arm by a bolt 18. As may be seen in the top view shown in FIG. 2 and the end view shown in FIG. 3, the bolt 18 passes through ears 20 extending from the actuator, and through a hole in the arm 12 positioned between the actuator arms. A nut 22 secures the bolt.

The bolt 18 has an extension 24 which passes through a slot 26 in the bracket 16 as shown in FIGS. 2 and 3, and shown in greater detail in FIG. 4, which is a view taken along a line 4-4 in FIG. 3. One end of a spring 28 is connected to the bolt extension 24. The other end of the spring is secured to the bracket 16 by a bolt 30. The spring is under tension to rotate the arm 12 counterclockwise as viewed in FIG. 1, toward a crank arm 32. The servo actuator 10 is connected to the crank arm 32 by a rod 34, and the crank arm 32 is connected to a shaft 36 which controls a fuel supply valve (not shown) for a jet engine.

The crank arm shown in FIG. 1 is in the full-off position, i.e., a position to turn the shaft 36 counterclockwise sufficiently to "bottom" the control valve, for a "0" volts command input. As the command input to the servo actuator increases from "0" volts, the actuator rod 34 is retracted. As the servo actuator is commanded to extend and retract, the fuel valve is moved to any position from full-off to full-on. So at "0" volts command, the servo actuator extends almost full length to cut off the engine when the fuel control valve is "bottomed," i.e., when the crank arm is in the full counterclockwise position. A feedback potentiometer in the servo actuator 10 cancels the command input when the actuator rod 34 reaches the commanded position. This feedback arrangement is schematically indicated by a potentiometer 38, although it is to be understood to be an internal part of the servo actuator 10. Such a servo actuator used in a preferred embodiment of the invention is a linear servo made by Avonic Products Engineering Corporation of Denville, New Jersey for J-85 jet engine throttle control.

Because the valve has to be bottomed for cut off, the servo actuator cannot be electronically controlled to absolute "0" volts from feedback potentiometers to cancel the "0" volt command input due to mechanical overrun and fast transient response requirements. This condition may result in burning out the motor in the servo actuator.

To assure that the throttle valve bottoms for a "0" volts command input, the spring 28 is attached to the free end of the pivoted support arm 12. This causes the servo actuator to move to the left in FIG. 1, thereby to fully bottom the fuel valve, i.e., to place the crank arm 32 in the full-off position, without damaging the valve, and causes the feedback potentiometer to settle to the "0" volts output position, thereby turning off drive current to the motor in the servo actuator. In that manner, the "0" volts command input will allow the pivotally mounted servo actuator to bottom the fuel valve without damage to the fuel valve or to the servo actuator motor and feedback potentiometer.

Mechanical travel limits to this pivotally mounted servo actuator may be adjusted to reduce the possibility of the feedback potentiometer "bottoming out," which could then open the potentiometer feedback circuit and cause the motor in the servo actuator to burn out in just one or two seconds. That is accomplished by providing a stop bolt 40 (shown in FIG. 1 without a nut 41) which passes through a slot 42 in the pivoted support arm. A spacer 43 shown in FIG. 3 will hold the bolt 40 rigid without tightening the nut so as to allow the support arm 12 to pivot under the bolt. Threaded into the slot through the side of the support arm 12 is a set bolt 44. A lock nut 45 secures the set bolt 44 to the desired limit stop position.

In practice, the spring selected for a desired break-out tension will depend upon the application of the invention. In the application referred to above for throttle control of a J-85 jet engine, the break-out tension selected was 8 pounds. The term "break-out tension" means the force applied before the spring starts to yield.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a bracket for mounting a linear servo actuator having a control rod which extends to rotate a crank arm through a limited angle in a direction to move an element to be controlled to an extreme position when the control rod is extended to its full control position in response to a zero input signal, said servo actuator having a position feedback potentiometer for cancelling the input signal, the combination comprising a fixed mounting bracket, a support arm, means for pivotally supporting said support arm at a first fixed point on said bracket, means for pivotally supporting said crank arm at a second fixed point on said bracket displaced from said first fixed point, said crank arm being pivotally connected to the end of said control rod remote from said actuator, a slot in said fixed mounting bracket, means for pivotally connecting said servo actuator to said support arm at the end thereof remote from said first fixed point, said means having a rigid extension protruding through said slot in said fixed mounting bracket, a coil spring connected between said extension through said slot and a fixed point between said first and second points, whereby said actuator and control rod are biased to move to said extreme position when said control rod is fully extended, and limit means for limiting the extent of movement of said support arm under the force of said spring in a direction to rotate said crank arm to an extreme position when said control rod is fully extended.

2. The combination of claim 1 wherein said limit means is comprised of a slot in said support arm, a pin secured to said bracket passing through said slot.

3. The combination of claim 2 further including a set bolt threaded through the side of said support arm remote from said actuator into said support arm, said arm, and a lock nut threaded over said set bolt and against said support arm.

* * * * *